Figure 1:
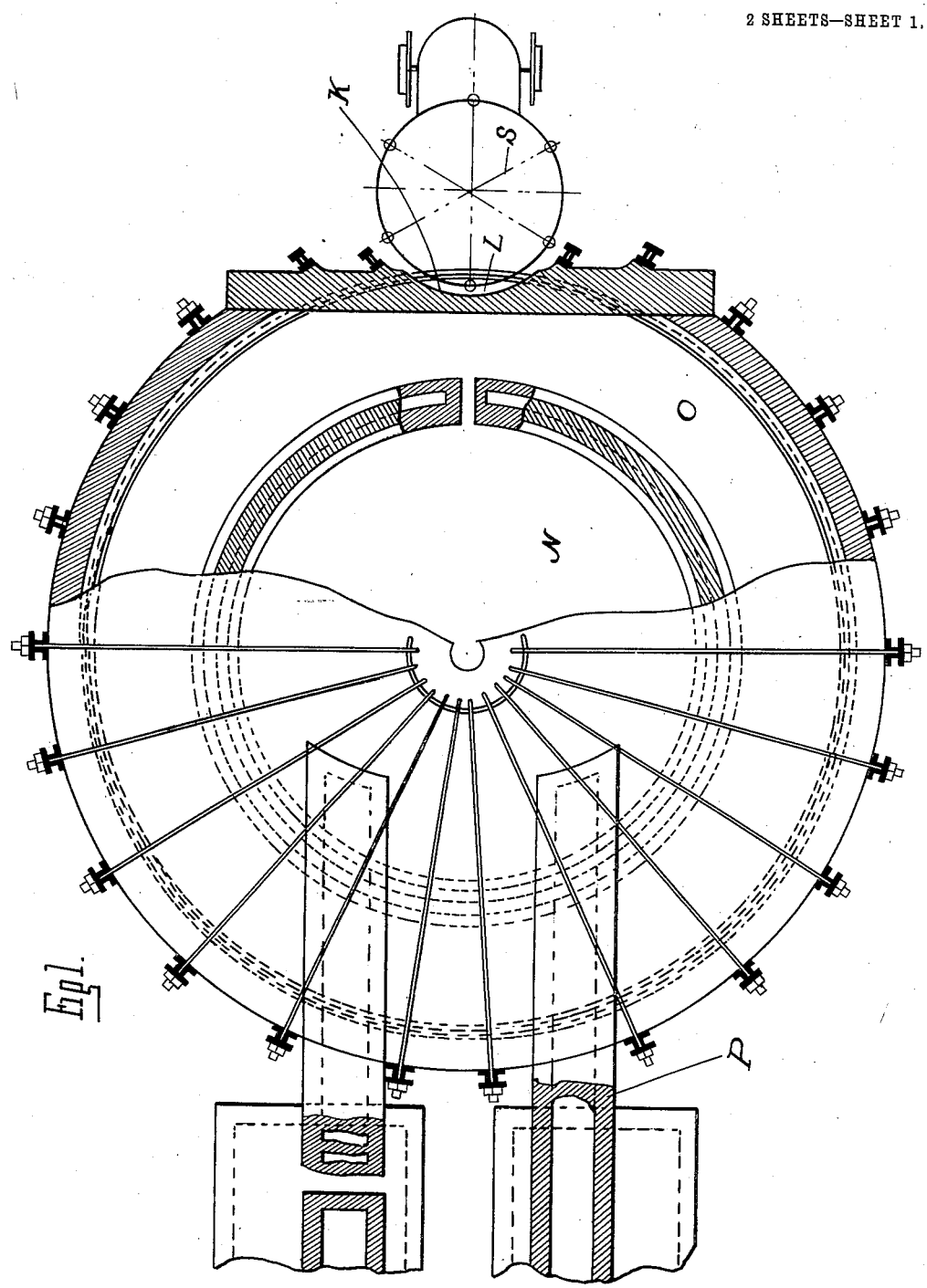

C. W. SCHWENZFEIER.
GLASS TANK.
APPLICATION FILED OCT. 15, 1907.

908,151.

Patented Dec. 29, 1908.

2 SHEETS—SHEET 1.

Witnesses
W. K. Ford
James P. Barry.

Inventor
Charles W. Schwenzfeier
By Whittemore, Hulbert & Whittemore
Attys

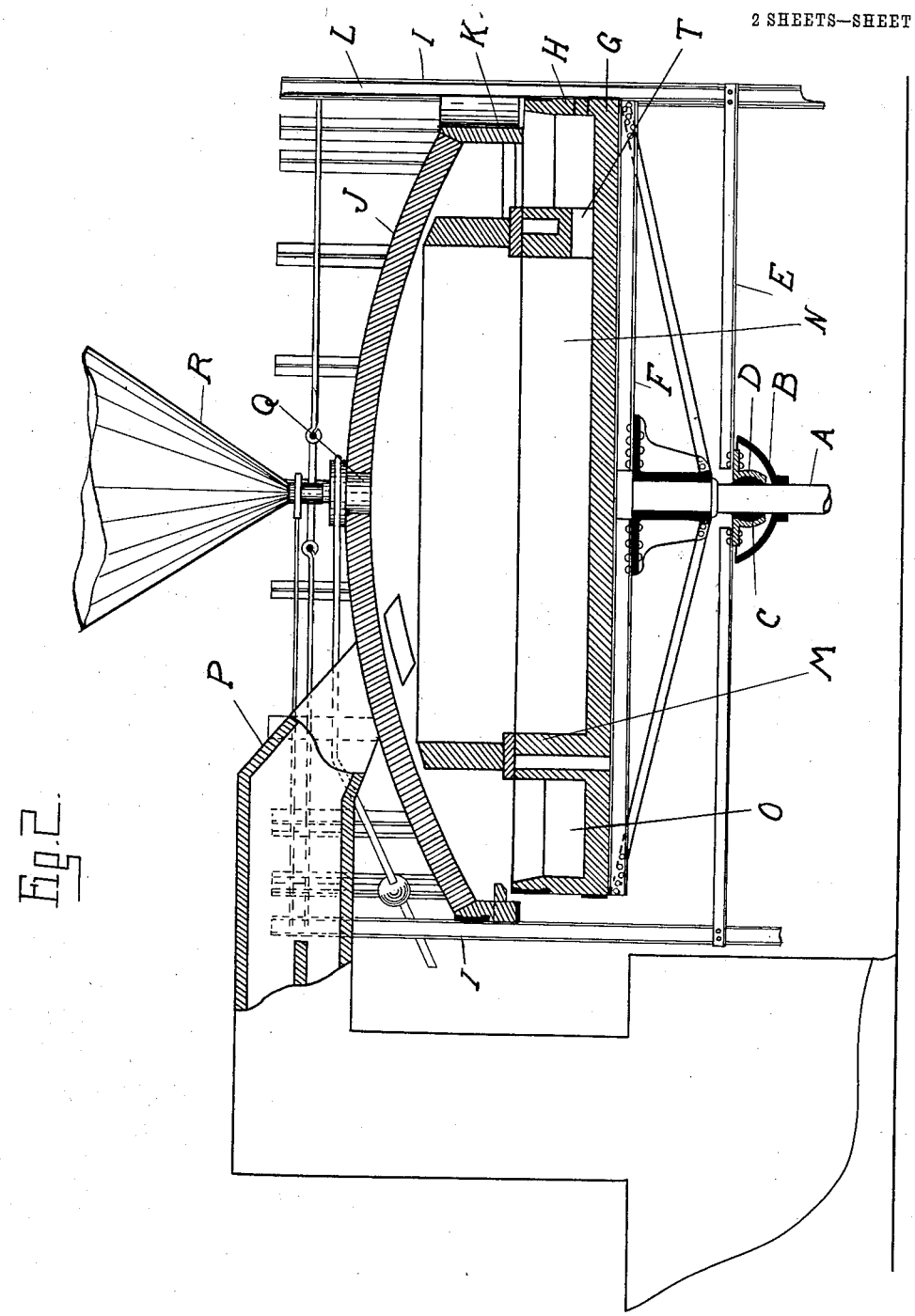

UNITED STATES PATENT OFFICE.

CHARLES WILLY SCHWENZFEIER, OF MANCHESTER, ENGLAND, ASSIGNOR TO THE TOLEDO GLASS COMPANY, OF TOLEDO, OHIO, A CORPORATION OF OHIO.

GLASS-TANK.

No. 908,151.	Specification of Letters Patent.	Patented Dec. 29, 1908.

Application filed October 15, 1907. Serial No. 397,490.

*To all whom it may concern:*

Be it known that I, CHARLES WILLY SCHWENZFEIER, a citizen of the United States of America, residing at Manchester, in the county of Lancaster, England, have invented certain new and useful Improvements in Glass-Tanks, of which the following is a specification, reference being had therein to the accompanying drawings.

The invention relates to improvements in glass melting tanks.

In the use of machines which gather from a mass of molten glass, such for instance as shown in Patent No. 766,768, dated August 2, 1904, it has been found that the dipping of the gathering tool or mold into the glass chills it. There has also been used a traveling or rotary tank from which the glass was gathered, the chilled or gathering point moving under a hood or into a heating chamber to be reheated before a succeeding gathering operation. With such previous devices the glass was melted in a stationary tank of the so-called "continuous" type, and flowed by gravity from a spout into the rotary tank at a point within the heating chamber. With some kinds of glass this previously used construction is very satisfactory, but with others it has been found that the glass in the rotary tank contains bubbles, which in the blown article give a bad appearance or defect which it is very desirable to avoid. It is probable that these bubbles arise or are formed by the falling of the glass from the stationary tank into the rotary tank, and as this delivery of the glass takes place near the periphery of the rotary tank the bubbles are substantially at the gathering point. It is difficult, if not impossible, to carry the spout any further into the rotary tank, because of the intense heat within the heating chamber in which this spout would have to be located.

The present invention contemplates the constructing of a rotary or traveling tank of sufficient size to combine with it the melting tank, preferably as a central chamber therein, supplying the gas to this central chamber beneath, a suitable cover over the tank, and providing a partition which will separate this heating chamber from the outer portion of the tank, which outer portion may be called the working or refining chamber, and into which the glass flows through the lower portion of the partition. In this way I am enabled to get the glass from the melting chamber to the working or refining chamber without any falling thereof from one chamber to another, and also, as I preferably feed the material into the center of the melting chamber, I obtain a sufficiently long interval between the time that the glass is melted at the middle and flows downward and outward to the periphery so that if any bubbles are formed plenty of time is given for them to dissipate, as they will if sufficient time is allowed.

In the drawings, Figure 1 is a top plan view of my improved tank, with a part of the top broken away, and showing a diagram illustrating the position of the gathering machine and showing the exposed point at which the gathering machine operates; Fig. 2 is a longitudinal section through my improved device.

A represents a vertical shaft which at its lower end is supported in any suitable manner, preferably by having an enlarged bottom plate resting on rollers and driven by any suitable drive mechanism, such for instance as a worm and a worm wheel. This construction of support and drive mechanism may be of any usual stepped shaft construction, and therefore I do not deem it necessary to illustrate it. Near the upper part of the shaft I secure the bowl-shaped casting B, and within this I secure to the shaft the collar C having a curved outer face, making a substantially spherical bearing, around which is fitted the complementary bearing D secured to the cross-bars E, which act as a stay for the upper portion of the shaft. To the upper end of the shaft is secured a frame work F, which may be and preferably is a trussed metallic frame work, and upon which frame work is secured a comparatively shallow tank G, this tank being circular in form and having the outer vertical side wall H.

I I are vertical standards around the tank, from which is supported the roof or cover J of the brick work, as usual, and of complementary form, so as to entirely close the circular tank, in the manner clearly shown at the left, Fig. 2. At one point (or more than one point as desired),—wherever the gathering or dipping is to take place,—I provide the segmental wall (or walls) K, so arranged as to allow a small segment of the tank to project out beyond the cover or top and leave a dipping or gathering section L of the tank exposed, as clearly illustrated at the right, Figs. 1 and 2.

Within the tank I provide a partition M, which may be and preferably is a hollow partition, to keep it from burning out, and this partition is preferably a circular partition, so that there will be formed within the tank a central chamber N and an outer annular chamber O. The partition M may and preferably does extend to up near the roof or cover over the tank, there being sufficient room, however, so that some of the heat and flame directed into the melting chamber will pass over into the outer or annular working chamber, so as to maintain it at the proper temperature.

Through the cover or top I provide one or more gas inlet passages P, which may be connected with any suitable source of gas supply. In the drawings I have shown two gas inlets, one on either side of the center, and these are preferably operated in the usual way,—that is the gas is first taken in through one and out through the other, and then the supply and exit reversed. It will be observed that the gas inlet is into the interior or melting chamber. Centrally of the top or cover I have shown a valve-controlled inlet Q, with a hopper R above the same, so constructed and arranged that when the valve is removed and the hopper lowered through the aperture the "batch" to be melted may be fed into the center of the melting chamber.

At S I have indicated a gathering machine of the rotary type, the small circles around the machine showing the position of the molds which are adapted to dip into the exposed or gathering section L of the rotary tank.

The parts being thus constructed, their operation is as follows: The tank being charged with batch, through the hopper R, the glass will fall into the interior or central chamber of the tank, the gas being ignited and discharged therein in the usual manner, the glass will melt and flow from the middle to the sides and out through a port or ports T in the lower portion of the partition M into the outer annular chamber O. When the desired level of glass is thus obtained in the annular chamber, rotary motion is imparted to the tank and the gathering machine set in operation, the machine gathering the desired quantity of glass from the section L.

It will be observed that the glass will have a chance to settle or rid itself of bubbles in passing from the melting point in the center of the melting-chamber to its edge, and also in passing through the inner portion of the outer refining or working chamber, and that at no time is there any dropping of the glass from one level to another, which as before described would have a tendency to create bubbles.

This construction is also desirable for the reason that it gives a large area around the tank free from brickwork or other obstructions, so that a multiple of machines may be placed around the same tank and thus economize space in the factory.

What I claim is,—

1. A glass furnace comprising a stationary top and a rotating tank forming the bottom, having a portion of its marginal surface exposed for gathering, a partition dividing the rotating tank into an inner melting chamber and an outer working chamber, and dividing the furnace chamber correspondingly, and means for feeding batch into the melting chamber.

2. A glass furnace comprising a stationary top and a rotating tank forming the bottom, having a portion of its marginal surface exposed for gathering, an annular partition dividing the tank and the furnace into inner and outer chambers, means for feeding batch into the inner chamber through the top, the top of the inner chamber having gas inlets and outlets.

In testimony whereof I affix my signature in presence of two witnesses.

CHARLES WILLY SCHWENZFEIER.

Witnesses:
J. W. H. ADABSHAW,
I. T. D. SMITH.